United States Patent
Hussein et al.

(10) Patent No.: US 9,512,254 B2
(45) Date of Patent: Dec. 6, 2016

(54) INCREASED POLYMER MELT FLOW RATIO VIA FEED OF A SUPPORTED CATALYST SATURATED WITH A SELECTED LIQUID AGENT

(71) Applicant: Univation Technologies, LLC, Houston, TX (US)

(72) Inventors: F. David Hussein, Hilton Head Island, SC (US); Daniel P. Zilker, Jr., Charleston, WV (US); Kevin J. Cann, Rocky Hill, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/406,369

(22) PCT Filed: Jun. 14, 2013

(86) PCT No.: PCT/US2013/045938
§ 371 (c)(1),
(2) Date: Dec. 8, 2014

(87) PCT Pub. No.: WO2014/011357
PCT Pub. Date: Jan. 16, 2014

(65) Prior Publication Data
US 2015/0133614 A1    May 14, 2015

Related U.S. Application Data

(60) Provisional application No. 61/671,525, filed on Jul. 13, 2012.

(51) Int. Cl.
*C08F 4/6592* (2006.01)
*C08F 210/16* (2006.01)
*C08F 4/659* (2006.01)

(52) U.S. Cl.
CPC ......... *C08F 210/16* (2013.01); *C08F 4/65916* (2013.01); *C08F 4/65912* (2013.01); *C08F 4/65925* (2013.01)

(58) Field of Classification Search
CPC ............ C08F 4/65912; C08F 4/65916; C08F 4/6592; C08F 210/16
See application file for complete search history.

(56) References Cited

FOREIGN PATENT DOCUMENTS

EP    1234837    8/2002

*Primary Examiner* — Caixia Lu
(74) *Attorney, Agent, or Firm* — Brooks, Cameron & Huebsch, PLLC

(57) ABSTRACT

A process for the production of ethylene alpha-olefin copolymers is disclosed. The process may include feeding a catalyst system comprising a supported metallocene, such as a hafnocene, having pores saturated with a selected liquid agent, to a gas phase polymerization reactor. Ethylene and an alpha-olefin may then be contacted with the supported metallocene in the gas phase polymerization reactor to produce an ethylene alpha-olefin copolymer. The copolymer may have a density of less than 0.93 g/cm$^3$, a melt index ($I_2$) of less than 2 dg/min, and a melt flow ratio ($I_{21}/I_2$) of at least 28. To advantageously result in desired effects on catalyst properties and/or polymer properties, the liquid agent may be selected to advantageously manipulate catalyst temperature profiles and/or catalyst-monomer interaction during an initial heating period when the catalyst is first introduced to the reactor.

16 Claims, No Drawings

INCREASED POLYMER MELT FLOW RATIO VIA FEED OF A SUPPORTED CATALYST SATURATED WITH A SELECTED LIQUID AGENT

CROSS-REFERENCE TO RELATED APPLICATIONS

This application is a National Stage application under 35 U.S.C. §371 of International Application No. PCT/US2013/45938, filed Jun. 14, 2013, that claims the benefit of Ser. No. 61/671,525, filed Jul. 13, 2012, the disclosures of which are incorporated by reference in their entireties.

BACKGROUND

There has been tremendous focus in the polyolefin industry on developing new and improved metallocene catalyst systems, designing catalyst systems to produce new polymers, to improve operability or processability of catalyst systems, and to improve catalyst productivity. Reactor conditions and the catalyst employed in the polymerization can affect numerous physical and chemical properties of the polymer, including molecular weight, molecular weight distribution, compositional distribution, crystallinity and melting temperature, and extractable content (e.g. hexane extractables), among others. Reactor conditions and the catalyst employed in the polymerization can also affect the processability of the resulting polymer. Polymer processability refers to the ability to economically process and shape a polymer uniformly. Processability involves such elements as how easily the polymer flows, melt strength, and whether the extrudate is distortion free. Small changes in mechanical properties and polymer processing flexibility are welcomed by end users.

In addition to the several reactor and reactant process control variables which may be manipulated during production, polymer product properties may also vary based upon catalyst formulation and structure. The metal atom and the ligands (pi-bonded moieties) forming the metallocene complex can affect the properties of the polymer product formed. The support architecture, the number of functional groups on the support (such as —OH groups on silica), the activator loading, and the pre-impregnated catalyst loading can also affect the product formed.

Recent advances in polymerization and catalysis have resulted in the ability to produce many new polymers having improved physical and chemical properties useful in a wide variety of superior products and applications. Regardless of these technological advances in the polyolefin industry, common problems, as well as new challenges still exist. There is a need, therefore, for improved catalysts that have improved activity and produce polymer products that have improved properties. Applicants have now found that catalyst performance and properties of the polymer product formed may be influenced by the manner in which the catalyst is delivered to a gas phase polymerization system.

SUMMARY

Disclosed herein are processes for the production of ethylene alpha-olefin copolymers. The process may include feeding a catalyst system comprising a supported metallocene having pores saturated with a selected liquid agent to a gas phase polymerization reactor and contacting ethylene and an alpha-olefin with the supported metallocene in the gas phase polymerization reactor to produce an ethylene alpha-olefin copolymer. Preferably the supported metallocene is a supported hafnocene catalyst. The ethylene alpha-olefin copolymer may have a density of less than 0.93 g/cm$^3$, a melt index ($I_2$) of less than 2 dg/min, and a melt flow ratio ($I_{21}/I_2$) of at least 28.

The liquid agent may be selected to advantageously manipulate catalyst temperature profiles and/or catalyst-monomer interaction during an initial heating period when the catalyst is first introduced to the reactor. Such a selection may result in advantageously effecting the resulting catalyst properties and/or polymer properties, Other aspects and advantages of the processes described herein will be apparent from the following description and the appended claims.

DETAILED DESCRIPTION

Disclosed herein are processes for the production of ethylene alpha-olefin copolymers. The process may include feeding a catalyst system comprising a supported metallocene, such as a hafnium based catalyst, having pores saturated with a selected liquid agent, to a gas phase polymerization reactor. "Saturated," as used herein may additionally or alternatively refer to partially saturated, saturated as well as over-saturated or supersaturated, such that the catalyst system may be solidous or liquidous in flow properties when combined with the selected liquid agent. In some embodiments, the catalyst may be partially saturated with the selected liquid agent; saturated in other embodiments; over- or super-saturated in yet other embodiments. In some embodiments, the catalyst selected liquid agent mixture may have solidous flow properties; liquidous flow properties in other embodiments.

To result in desired effects on catalyst properties and/or polymer product properties, the liquid agent may be selected to advantageously manipulate catalyst temperature profiles and/or catalyst-monomer interaction during an initial heating period when the catalyst is first introduced to the reactor.

When a dry catalyst is fed to a gas phase reactor, the initial peak temperature at catalyst active sites as well as the temperature gradient across the catalyst particle may increase to a point where it affects the overall catalyst activity when initially exposed to reactants. Some metallocene catalysts may also lose activity at high temperatures. However, when the catalyst is saturated in a selected liquid agent, the initial peak temperature at the catalyst site as well as the temperature gradient may be lowered when exposed to reaction conditions, the inert liquid agent around the catalyst particle acting as a heat sink. This may be attributed to the higher thermal conductivity of the liquid and lower diffusion rate of ethylene in the liquid.

While the actual mechanism may only be theorized, the use of a selected liquid agent has been surprisingly found to result in a polymer product having a significant increase in melt flow ratio as compared to feed of the same catalyst as a dry catalyst system to the gas phase reactor under substantially equivalent reaction conditions. As used herein, substantially equivalent refers to the reaction conditions, such as temperature, pressure, hydrogen ratio, comonomer ratio, and other variables as being within a statistically insignificant deviation. For example, a reactor may have a set point of 77° C., whereas the control system may result in an average reactor temperature of about 76.7° C. for one experiment and an average reactor temperature of about 77.3° C. for a comparative experiment. One skilled in the art may understand, in the general scheme of reactor control, that such a deviation is not statistically insignificant with respect to product polymer properties, such as melt flow ratio.

As an example of melt flow ratio effects, when a metallocene (respectively hafnocene) catalyst system is fed as dry, the polymerization reaction temperature may be adjusted to T1, for example, to keep the melt flow ratio at a target of about 28. At this temperature the polymer production from a gas phase reactor is limited by the heat removal capability at that production rate, PR1. However, when the same catalyst is fed saturated with a selected liquid agent, according to the processes described herein, the melt flow ratio of the polymer increases, thus allowing an increase in reactor temperature while maintaining a melt flow ratio at least 28. This temperature increase, in turn, increases the reactor heat removal capability and thus enables a higher reactor capacity, i.e., a production rate higher than PR1.

The liquid agent may be selected to decrease a rate of temperature increase of a supported metallocene, such as a hafnocene, following introduction of the catalyst into the reactor (i.e., during an initial contact stage upon entry to the reactor) as compared to the same supported metallocene, such as a hafnocene, fed to the reactor as a dry particle system. The temperature gradient around the catalyst particle may be impacted, for example, by displacement and/or evaporation of the selected liquid agent, gradual dissolution of the liquid agent into the gas phase, and/or restricted transport of monomer to the catalytically active sites, among other effects.

A lower catalyst temperature may thus result in a polymer product having a higher melt flow ratio during the initial stages of polymerization, and may result in a final polymer product having a statistically significant difference in melt flow ratio. For example, feed of a metallocene catalyst, such as a hafnocene, for example silica supported bis(n-propyl-cyclopentadiene)hafniumdimethyl with methylalumoxane, having pores saturated with a selected liquid agent may produce an ethylene alpha-olefin copolymer having a melt flow ratio at least 10% greater than an ethylene alpha-olefin copolymer produced with the same supported metallocene fed to the reactor as a dry particle system under substantially equivalent reaction conditions. As another example, feed of a metallocene catalyst, such as a hafnocene, having pores saturated with a selected liquid agent may produce an ethylene alpha-olefin copolymer having a melt flow ratio in the range of from about 32 to about 36 or higher, whereas an ethylene alpha-olefin copolymer produced with the same supported metallocene fed to the reactor as a dry particle system under substantially equivalent reaction conditions may only have a melt flow ratio in the range of from about 28 to about 30. In another example, the ethylene alpha-olefin copolymer product may have a melt flow ratio at least 2 units greater than an ethylene alpha-olefin copolymer produced with the same supported hafnocene fed to the reactor as a dry particle system under equivalent reaction conditions.

The liquid agent may thus be selected to alter a kinetic profile of catalytically active sites on the supported metallocene, such as a hafnocene, during an initial contact stage upon entry to the reactor as compared to the same supported metallocene fed to the reactor as a dry particle system. The kinetic profile may also be impacted by the temperature rise and resulting fracturing properties of the catalyst particle during the polymerization process.

The impact of the selected liquid agent on polymer product melt flow ratio at equivalent reaction conditions may thus allow an operator to increase reaction temperature to produce a polymer having an equivalent melt flow ratio. The increase in reactor temperature may provide for a concomitant increase in reactor capacity. For example, the liquid agent may be selected to produce an ethylene alpha-olefin having a melt flow ratio substantially equal to that produced by the same supported hafnocene fed to the reactor as a dry particle system when produced at a temperature at least 2° C. greater, or at least 3° C. greater, than for the dry particle system under otherwise equivalent reaction conditions.

The supported hafnocene may have a catalyst productivity at least 10% greater than the same supported hafnocene fed to the reactor as a dry particle system under equivalent reaction conditions.

While the impact the selected liquid agent may have on the supported metallocene catalyst may occur regardless of the target polymer properties, the statistical significance of the impact may be greater for polyethylenes having a lower density or for particular grades of polyethylenes. For example, it is generally desired to have a melt flow ratio of at least 28 for extrusion or film grade low density polyethylenes to provide for adequate processability. In contrast, high density polyethylenes may have a target melt flow ratio of about 20. Thus, advantages resulting from use of the selected liquid agent may be more significant where the target ethylene alpha olefin has a target melt index of less than 2 dg/min, a target melt flow ratio of at least 28, and a target density of less than about 0.93 g/cm$^3$.

The ethylene alpha-olefin copolymer may have a melt index ($I_2$) of less than 2 dg/min. In some embodiments, the ethylene alpha-olefin copolymer may have a melt index in the range of from about 0.5 dg/min to about 1.5 dg/min, or in the range of from about 0.8 dg/min to about 1.2 dg/min, or in the range of from about 0.9 dg/min to about 1.1 dg/min, or in the range of from about 0.9 dg/min to about 1 dg/min. As used herein, melt index refers to the $I_2$, which is the flow rate of a molten polymer at 190° C. that flows through a die with a diameter of 2 mm and a length of 8 mm under the effect of a piston ballasted with a mass of 2.16 kg, according to ASTM standard D-1238-E.

The ethylene alpha-olefin copolymer may have a melt flow ratio of at least 28. In some embodiments, the ethylene alpha-olefin copolymer may have a melt flow ratio of at least 32, or at least 35. The melt flow ratio may give an indication of polymer melt processing properties and is the ratio of the copolymer's $I_{21}$ to $I_2$. The $I_{21}$ is the high flow melt index, which is the flow rate of a molten polymer at 190° C. that flows through a die with a diameter of 2 mm and a length of 8 mm under the effect of a piston ballasted with a mass of 21.6 kg, according to ASTM standard D-1238-F.

The ethylene alpha-olefin copolymer may have a density of less than about 0.93 g/cm$^3$. In some embodiments, the ethylene alpha-olefin copolymer may have a density in the range from about 0.900 g/cm$^3$ to about 0.927 g/cm$^3$. Density may be measured in accordance with ASTM D-792.

The ethylene alpha-olefin copolymer may have a ratio of melt flow ratio to melt index of at least 33:1.

As noted above, it is desirable for the liquid agent selected to have a prolonged or statistically relevant period in which the catalyst particle produces a polymer product having a structure different than that produced when the catalyst reaches equilibrium temperature. Thus, selected liquid agents according to embodiments may include a hydrocarbon or mixture of hydrocarbons, such as a linear, branched, or cyclic hydrocarbon, preferably saturated or non-reactive under polymerization conditions, having at least 12, 15, 18, 20, 30, or 40, or more carbon atoms. In other embodiments, a purified mineral oil, such as HYDROBRITE 380 mineral oil (available from Sonneborn, Inc, Mahwah, N.J.), may be used as the selected liquid agent. The catalyst particles having pores saturated with the selected liquid agent may be fed to a gas phase polymerization reactor using any type of system suitable for transport of the catalyst, and may depend on the degree of saturation or over-saturation in which the liquid agent is used, as would be recognized by one of ordinary skill in the art.

The liquid agents listed above may have different impacts upon the catalyst systems due to the molecular weight, boiling point, viscosity, and other particular properties of the liquid agent. Accordingly, the liquid agent may be selected so as to provide a desired impact on polymer product properties, such as to provide a selected or desired increase in melt flow ratio over the same catalyst fed as a dry catalyst system to the gas phase polymerization reactor.

As described above, the use of a selected liquid agent may be advantageous when used with a supported metallocene, such as the various metallocenes described below. However, in some preferred embodiments, the selected liquid agent may be used with a supported hafnocene selected from: bis(n-propylcyclopentadienyl)hafnium $X_n$, bis(n-butylcyclopentadienyl)hafnium $X_n$, bis(n-pentylcyclopentadienyl)hafnium $X_n$, (n-propyl cyclopentadienyl)(n-butylcyclopentadienyl)hafnium $X_n$, bis[(2-trimethylsilylethyl)cyclopentadienyl]hafnium $X_n$, bis(trimethylsilylcyclopentadienyl)hafnium $X_n$, dimethylsilylbis(n-propylcyclopentadienyl)hafnium $X_n$, dimethylsilylbis(n-butylcyclopentadienyl)hafnium $X_n$, bis(1-n-propyl-2-methylcyclopentadienyl)hafnium $X_n$, (n-propylcyclopentadienyl)(1-n-propyl-3-n-butylcyclopentadienyl)hafnium $X_n$; wherein $X_n$ is selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons and substituted derivatives thereof, where $X_n$ is as described below. In some embodiments, the hafnocene may be a silica supported bis(n-propyl-cyclopentadiene)hafniumdimethyl with methylalumoxane.

The alpha-olefin used in combination with ethylene to form the ethylene alpha-olefin copolymer may include propylene, butene, hexene, octene, or combinations thereof. In some embodiments, the alpha-olefin is selected from hexene and octene.

Metallocene Catalyst Compounds

The metallocene catalyst compounds useful in embodiment herein may include "half sandwich" and "full sandwich" compounds having one or more "Cp" ligands (cyclopentadienyl and ligands isolobal to cyclopentadienyl) bound to at least one Group 3 to Group 12 metal atom, and one or more leaving groups bound to the at least one metal atom. Hereinafter, these compounds will be referred to as "metallocenes" or "metallocene catalyst components". The metallocene catalyst component may be supported on a support material, as described further below, and may be supported with or without another catalyst component. Useful metallocenes may include those described in U.S. Pat. Nos. 8,084,560 and 7,579,415.

The Cp ligands are one or more rings or ring system(s), at least a portion of which includes pi-bonded systems, such as cycloalkadienyl ligands and heterocyclic analogues. The ring(s) or ring system(s) typically comprise atoms selected from Groups 13 to 16 atoms, and, in particular exemplary embodiments, the atoms that make up the Cp ligands are selected from carbon, nitrogen, oxygen, silicon, sulfur, phosphorous, germanium, boron and aluminum and combinations thereof, wherein carbon makes up at least 50% of the ring members. For example, the Cp ligand(s) may be selected from substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof (as described in more detail below), and heterocyclic versions thereof.

The metal atom "M" of the metallocene catalyst compound may be selected from Groups 3 through 12 atoms and lanthanide Group atoms. For example, the metal atom "M" may be selected from Groups 3 through 10 atoms; or may be selected from Sc, Ti, Zr, Hf, V, Nb, Ta, Mn, Re, Fe, Ru, Os, Co, Rh, Ir, and Ni; or may be selected from Groups 4, 5, and 6 atoms; or may be selected from Ti, Zr, and Hf atoms; or may be Zr. The oxidation state of the metal atom "M" may range from 0 to +7; or may be +1, +2, +3, +4, or +5; or may be +2, +3, or +4. The groups bound to the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

Useful metallocene catalyst components may include those represented by the formula (I):

$$Cp^A Cp^B MX_n \qquad (I)$$

wherein M is as described above; each X is chemically bonded to M; each Cp group is chemically bonded to M; and n is 0 or an integer from 1 to 4, or is 1 or 2.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. For example, $Cp^A$ and $Cp^B$ may be independently selected from cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structures (Va-d) include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (I) through (Va-d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituents R include, but are not limited to, olefins such as olefinically unsaturated substituents including vinyl-terminated ligands such as, for example, 3-butenyl, 2-propenyl, 5-hexenyl and the like. In some embodiments, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in the formula (I) above and for the formulae/structures (II) through (Va-d) below may be any leaving group or may be independently selected from: halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives; or may be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls; or may be selected from hydride, chloride, fluoride, methyl, phenyl, phenoxy, benzoxy, tosyl, fluoromethyls and fluorophenyls; or may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls; or may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or may be selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls); or may be fluoride in some embodiments.

Other non-limiting examples of X groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methoxy, ethyoxy, propoxy, phenoxy, bis(N-methylanilide), dimethylamide, dimethylphosphide radicals and the like. In some embodiments, two or more X's may form a part of a fused ring or ring system.

Other useful metallocene catalyst components may include those of formula (I) where $Cp^A$ and $Cp^B$ are bridged to each other by at least one bridging group, (A), such that the structure is represented by formula (II):

$$Cp^A(A)Cp^BMX_n \qquad \text{(II)}$$

These bridged compounds represented by formula (II) are known as "bridged metallocenes". The elements $Cp^A$, $Cp^B$, M, X and n in structure (II) are as defined above for formula (I); wherein each Cp ligand is chemically bonded to M, and (A) is chemically bonded to each Cp. Non-limiting examples of bridging group (A) include divalent hydrocarbon groups containing at least one Group 13 to 16 atom, such as at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, =Si(R')$_2$Si(R'$_2$)=, R'$_2$Ge=, and R'P= (wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; as well as dimethylsilyl, diethylsilyl, dimethylgermyl and diethylgermyl.

In some embodiments, bridging group (A) may also be cyclic, having, for example, 4 to 10 ring members, or 5 to 7 ring members. The ring members may be selected from the elements mentioned above, and, in some embodiments, are selected from one or more of B, C, Si, Ge, N and O. Non-limiting examples of ring structures which may be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In some embodiments, one or two carbon atoms are replaced by at least one of Si and Ge. The bonding arrangement between the ring and the Cp groups may be either cis-, trans-, or a combination.

The cyclic bridging groups (A) may be saturated or unsaturated and/or may carry one or more substituents and/or may be fused to one or more other ring structures. If present, the one or more substituents may be selected from hydrocarbyl (e.g., alkyl, such as methyl) and halogen (e.g., F, Cl). The one or more Cp groups to which the above cyclic bridging moieties may optionally be fused may be saturated or unsaturated, and may be selected from those having 4 to 10, or more particularly 5, 6, or 7 ring members (selected from C, N, O and S in some embodiments), such as, for example, cyclopentyl, cyclohexyl, and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) may be different from each other, or may be the same.

Useful metallocene catalyst components may also include bridged mono-ligand metallocene compounds (e.g., mono cyclopentadienyl catalyst components). In these embodiments, the at least one metallocene catalyst component is a bridged "half-sandwich" metallocene represented by the formula (III):

$$Cp^A(A)QMX_r \quad (III)$$

wherein $Cp^A$ is defined above and is bound to M; (A) is a bridging group bonded to Q and $Cp^A$; and an atom from the Q group is bonded to M; and r is an integer 0, 1 or 2.

In formula (III) above, $Cp^A$, (A) and Q may form a fused ring system. The X groups of formula (III) are as defined above in formula (I) and (II). In one exemplary embodiment, $Cp^A$ is selected from cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) may be selected from Group 15 atoms and Group 16 atoms. For example, the bonding atom may be selected from nitrogen, phosphorus, oxygen or sulfur atoms, or may be selected from nitrogen and oxygen. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds having Group 15 and Group 16 atoms capable of bonding with M.

Useful metallocene catalyst components may include unbridged "half sandwich" metallocenes represented by the formula (IVa):

$$Cp^AMQ_qX_w \quad (IVa)$$

wherein $Cp^A$ is defined as for the Cp groups in (I) and is a ligand that is bonded to M; each Q is independently bonded to M; X is a leaving group as described above in (I); w ranges from 0 to 3, and is 0 or 3; q ranges from 0 to 3, or is 0 or 3.

In formula (IVa) $Cp^A$ may be selected from cyclopentadienyl, indenyl, tetrahydroindenyl, fluorenyl, substituted versions thereof, and combinations thereof. In formula (IVa), Q may be selected from ROO⁻, RO—, R(O)—, —NR—, —CR$_2$—, —S—, —NR$_2$, —CR$_3$, —SR, —SiR$_3$, —PR$_2$, —H, and substituted and unsubstituted aryl groups, R may be selected from $C_1$ to $C_6$ alkyls, $C_6$ to $C_{12}$ aryls, $C_1$ to $C_6$alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

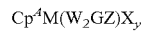

or

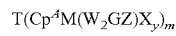

$$T(Cp^AM(W_2GZ)X_y)_m \quad (IVb)$$

wherein M, $Cp^A$, and X are as defined above; $W_2GZ$ forms a polydentate ligand unit (e.g., pivalate), wherein at least one of the W groups form a bond with M, and is defined such that each W is independently selected from —O—, —NR—, —CR$_2$— and —S—; G is either carbon or silicon; and Z is selected from R, —OR, —NR$_2$, —CR$_3$, —SR, —SiR$_3$, —PR$_2$, and hydride, providing that when W is —NR—, then Z is selected from —OR, —NR$_2$, —SR, —SiR$_3$, —PR$_2$; and provided that neutral valency for W is satisfied by Z; and wherein each R is independently selected from $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys; y is 1 or 2; T is a bridging group selected from $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^AM(W_2GZ)X_y$" groups, and is chemically bonded to the $Cp^A$ groups; and m is an integer from 1 to 7, or is an integer from 2 to 6.

Useful metallocene catalyst components may also include those described more particularly in structures (Va), (Vb), (Vc) and (Vd):

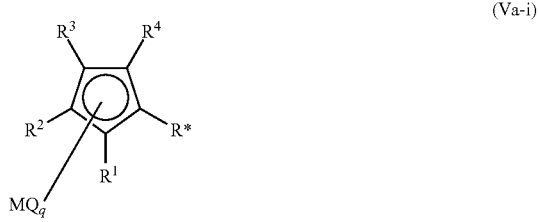

(Va-i)

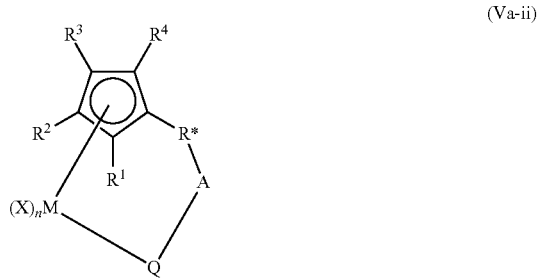

(Va-ii)

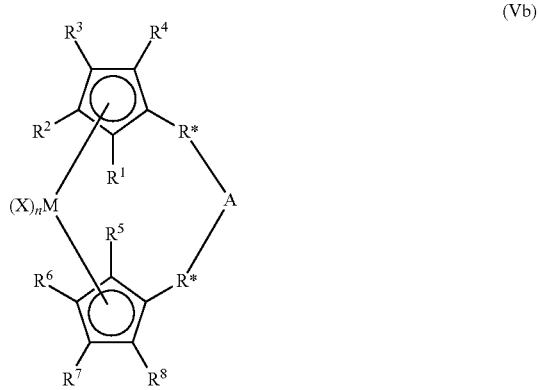

(Vb)

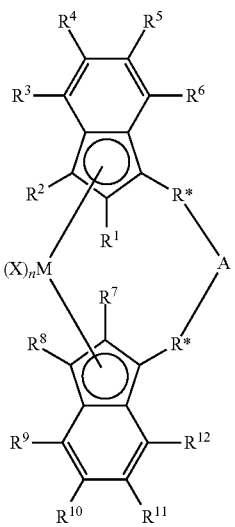

(Vc)

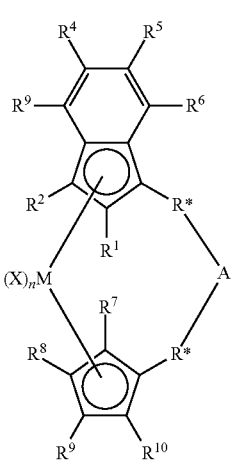

(Vd)

wherein in structures (Va) to (Vd) M is selected from Group 3 to Group 12 atoms, or is selected from Group 3 to Group 10 atoms, or is selected from Group 3 to Group 6 atoms, or is selected from Group 4 atoms, or is selected from Zr and Hf; or is Zr in some embodiments; wherein Q in (Va-i) and (Va-ii) is selected from halogen ions, alkyls, alkylenes, aryls, arylenes, alkoxys, aryloxys, amines, alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; q is an integer ranging from 1 to 3; wherein each R* is independently: selected from hydrocarbyls and heteroatom-containing hydrocarbyls, or is selected from alkylenes, substituted alkylenes and heteroatom-containing hydrocarbylsembodiment, or is selected from $C_1$ to $C_{12}$ alkylenes, $C_1$ to $C_{12}$ substituted alkylenes, and $C_1$ to $C_{12}$ heteroatom-containing hydrocarbons, or is selected from $C_1$ to $C_4$ alkylenes; and wherein both R* groups are identical in some embodiments in structures (Vb-d); A is as described above for (A) in structure (II), and more particularly, selected from —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ Cyclic hydrocarbons and substituted and unsubstituted aryl groups, or is selected from C5 to $C_8$ cyclic hydrocarbons, —CH$_2$CH$_2$—, =CR.sub.2 and =SiR$_2$; wherein R is selected from alkyls, cycloalkyls, aryls, alkoxys, fluoroalkyls, and heteroatom-containing hydrocarbons, or R is selected from $C_1$ to $C_6$ alkyls, substituted phenyls, phenyl, and $C_1$ to $C_6$ alkoxys, or R is selected from methoxy, methyl, phenoxy, and phenyl; wherein A may be absent in some embodiments, in which case each R* is defined as for $R^1$-$R^{12}$; each X is as described above in (I); n is an integer from 0 to 4, or from 1 to 3, or is 1 or 2; and $R^1$ through $R^{12}$ are independently selected from hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{12}$ fluoroalkyls, $C_6$ to $C_{12}$ fluoroaryls, and $C_1$ to $C_{12}$ heteroatom-containing hydrocarbons and substituted derivatives thereof, or are selected from hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, and $C_7$ to $C_{18}$ fluoroalkylaryls; or are selected from hydrogen radical, fluorine radical, chlorine radical, methyl, ethyl, propyl, isopropyl, butyl, isobutyl, tertiary butyl, hexyl, phenyl, 2,6-di-methylphenyl, and 4-tertiarybutylphenyl groups; wherein adjacent R groups may form a ring, either saturated, partially saturated, or completely saturated.

The structure of the metallocene catalyst component represented by (Va) may take on many forms, such as those described in, for example, U.S. Pat. Nos. 5,026,798, 5,703, 187, and 5,747,406, including a dimer or oligomeric structure, such as described in, for example, U.S. Pat. Nos. 5,026,798 and 6,069,213.

In some embodiments of the metallocene represented in (Vd), $R^1$ and $R^2$ form a conjugated 6-membered carbon ring system that may or may not be substituted.

Useful metallocene catalyst components may be selected from: cyclopentadienylzirconium $X_n$, indenylzirconium $X_n$, (1-methylindenyl)zirconium $X_n$, (2-methylindenyl)zirconium $X_n$, (1-propylindenyl)zirconium $X_n$, (2-propylindenyl) zirconium $X_n$, (1-butylindenyl)zirconium $X_n$, (2-butylindenyl)zirconium $X_n$, (methylcyclopentadienyl)zirconium $X_n$, tetrahydroindenylzirconium $X_n$, (pentamethylcyclopentadienyl)zirconium $X_n$, cyclopentadienylzirconium $X_n$, pentamethylcyclopentadienyltitanium $X_n$, tetramethylcyclopentyltitanium $X_n$, 1,2,4-trimethylcyclopentadienylzirconium $X_n$, dimethylsilyl(1,2,3,4-tetramethylcyclopentadienyl)(cyclopentadienyl)zirconium $X_n$, dimethylsilyl(1,2,3,4-tetramethylcyclopentadienyl)(1,2,3-trimethyl-cyclopentadienyl) zirconium $X_n$, dimethylsilyl(1,2,3,4-tetramethylcyclopentadienyl)(1,2-dimethyl-cyclopentadienyl)zirconium $X_n$, dimethylsilyl(1,2,3,4-tetramethyl-cyclopentadienyl)(2-methylcyclopentadienyl) zirconium $X_n$, dimethylsilyl(cyclopentadienyl)(indenyl) zirconium $X_n$, dimethylsilyl(2-methylindenyl)(fluorenyl) zirconium $X_n$, diphenylsilyl(1,2,3,4-tetramethyl-cyclopentadienyl)(3-propylcyclopentadienyl)zirconium $X_n$, dimethylsilyl(1,2,3,4-tetramethylcyclopentadienyl) (3-t-butylcyclopentadienyl)zirconium $X_n$, dimethylgermyl(1,2-dimethylcyclopentadienyl)(3-isopropylcyclopentadienyl)-zirconium $X_n$, dimethylsilyl(1,2,3,4-tetramethylcyclopentadienyl)(3-methylcyclopentadienyl)zirconium $X_n$, diphenylmethylidene(cyclopentadienyl)(9-fluorenyl)zirconium $X_n$, diphenylmethylidene(cyclopentadienyl)(indenyl) zirconium $X_n$, iso-propylidenebis(cyclopentadienyl)zirconium $X_n$, iso-propylidene(cyclopentadienyl)(9-fluorenyl)

zirconium $X_n$, is o-propylidene(3-methylcyclopentadienyl)(9-fluorenyl)zirconium $X_n$, ethylenebis(9-fluorenyl)zirconium $X_n$, meso-ethylenebis(1-indenyl)zirconium $X_n$, ethylenebis(1-indenyl)zirconium Xn, [0100] ethylenebis(2-methyl-1-indenyl)zirconium $X_n$, ethylenebis(2-methyl-4,5,6,7-tetrahydro-1-indenyl)zirconium $X_n$, ethylenebis(2-propyl-4,5,6,7-tetrahydro-1-indenyl)zirconium $X_n$, ethylenebis(2-isopropyl-4,5,6,7-tetrahydro-1-indenyl)zirconium $X_n$, ethylenebis(2-butyl-4,5,6,7-tetrahydro-1-indenyl)zirconium $X_n$, ethylenebis(2-isobutyl-4,5,6,7-tetrahydro-1-indenyl)zirconium $X_n$, dimethylsilyl(4,5,6,7-tetrahydro-1-indenyl)zirconium $X_n$, diphenyl(4,5,6,7-tetrahydro-1-indenyl)zirconium $X_n$, ethylenebis(4,5,6,7-tetrahydro-1-indenyl)zirconium $X_n$, dimethylsilylbis(cyclopentadienyl)zirconium $X_n$, dimethylsilylbis(9-fluorenyl)zirconium $X_n$, dimethylsilylbis(1-indenyl)zirconium $X_n$, dimethylsilylbis(2-methylindenyl)zirconium $X_n$, dimethylsilylbis(2-propylindenyl)zirconium $X_n$, dimethylsilylbis(2-butylindenyl)zirconium $X_n$, diphenylsilylbis(2-methylindenyl)zirconium $X_n$, diphenylsilylbis(2-propylindenyl)zirconium $X_n$, diphenylsilylbis(2-butylindenyl)zirconium $X_n$, dimethylgermylbis(2-methylindenyl)zirconium $X_n$, dimethylsilylbis(tetrahydroindenyl)zirconium $X_n$, dimethylsilylbis(tetramethylcyclopentadienyl)zirconium $X_n$, dimethylsilyl(cyclopentadienyl)(9-fluorenyl)zirconium $X_n$, diphenylsilyl(cyclopentadienyl)(9-fluorenyl)zirconium $X_n$, diphenylsilylbis(indenyl)zirconium $X_n$, cyclotrimethylenesilyl(tetramethylcyclopentadienyl)(cyclopentadienyl)zirconium $X_n$, cyclotetramethylenesilyl(tetramethylcyclopentadienyl)(cyclopentadienyl)zirconium $X_n$, cyclotrimethylenesilyl(tetramethylcyclopentadienyl)(2-methylindenyl)zirconium $X_n$, cyclotrimethylenesilyl(tetramethylcyclopentadienyl)(3-methylcyclopentadienyl)zirconium $X_n$, cyclotrimethylenesilylbis(2-methylindenyl)zirconium $X_n$, cyclotrimethylenesilyl(tetramethylcyclopentadienyl)(2,3,5-trimethylcyclopentadienyl)zirconium $X_n$, cyclotrimethylenesilylbis(tetramethylcyclopentadienyl)zirconium $X_n$, dimethylsilyl(tetramethylcyclopentadieneyl)(N-tert-butylamido)titanium $X_n$, bis(cyclopentadienyl)chromium $X_n$, bis(cyclopentadienyl)zirconium $X_n$, bis(n-butylcyclopentadienyl)zirconium $X_n$, bis(n-dodecyclcyclopentadienyl)zirconium $X_n$, bis(ethylcyclopentadienyl)zirconium $X_n$, bis(iso-butylcyclopentadienyl)zirconium $X_n$, bis(iso-propylcyclopentadienyl)zirconium $X_n$, bis(methylcyclopentadienyl)zirconium $X_n$, bis(n-oxtylcyclopentadienyl)zirconium $X_n$, bis(n-pentylcyclopentadienyl)zirconium $X_n$, bis(n-propylcyclopentadienyl)zirconium $X_n$, bis(trimethylsilylcyclopentadienyl)zirconium $X_n$, bis(1,3-bis(trimethylsilyl)cyclopentadienyl)zirconium $X_n$, bis(1-ethyl-2-methylcyclopentadienyl)zirconium $X_n$, bis(1-ethyl-3-methylcyclopentadienyl)zirconium $X_n$, bis(pentamethylcyclopentadienyl)zirconium $X_n$, bis(pentamethylcyclopentadienyl)zirconium $X_n$, bis(1-propyl-3-methylcyclopentadienyl)zirconium $X_n$, bis(1-n-butyl-3-methylcyclopentadienyl)zirconium $X_n$, bis(1-isobutyl-3-methylcyclopentadienyl)zirconium $X_n$, bis(1-propyl-3-butylcyclopentadienyl)zirconium $X_n$, bis(1-n-butyl-3-n-butylcyclopentadienyl)zirconium $X_n$, bis(1,3-methyl-n-butylcyclopentadienyl) zirconium $X_n$, bis(4,7-dimethylindenyl)zirconium $X_n$, bis(indenyl)zirconium $X_n$, bis(2-methylindenyl)zirconium $X_n$, cyclopentadienylindenylzirconium $X_n$, (tetramethyl cyclopentadienyl) (n-propyl cyclopentadienyl) zirconium $X_n$, (pentamethyl cyclopentadienyl) (n-propyl cyclopentadienyl) zirconium $X_n$, bis(n-propylcyclopentadienyl)hafnium $X_n$, bis(n-butylcyclopentadienyl)hafnium $X_n$, bis(n-pentylcyclopentadienyl)hafnium $X_n$, (n-propyl cyclopentadienyl)(n-butyl cyclopentadienyl) hafnium $X_n$, bis[(2-trimethylsilylethyl)cyclopentadienyl] hafnium $X_n$, bis(trimethylsilyl cyclopentadienyl)hafnium $X_n$, bis(2-n-propylindenyl)hafnium $X_n$, bis(2-n-butylindenyl)hafnium $X_n$, dimethylsilylbis(n-propylcyclopentadienyl)hafnium $X_n$, dimethylsilylbis(n-butylcyclopentadienyl)hafnium $X_n$, bis(9-n-propylfluorenyl)hafnium $X_n$, bis(9-n-butylfluorenyl)hafnium $X_n$, (9-n-propylfluorenyl)(2-n-propylindenyl)hafnium $X_n$, bis(1-n-propyl-2-methylcyclopentadienyl)hafnium $X_n$, (n-propylcyclopentadienyl)(1-n-propyl-3-n-butylcyclopentadienyl)hafnium $X_n$, dimethylsilyl(tetramethylcyclopentadienyl)(cyclopropylamido)titanium $X_n$, dimethylsilyl(tetramethyleyclopentadienyl)(cyclobutylamido)titanium $X_n$, dimethylsilyl(tetramethyleyclopentadienyl)(cyclopentylamido)titanium $X_n$, dimethylsilyl(tetramethylcyclopentadienyl)(cyclohexylamido)titanium $X_n$, dimethylsilyl(tetramethylcyclopentadienyl)(cycloheptylamido)titanium $X_n$, dimethylsilyl(tetramethylcyclopentadienyl)(cyclooctylamido)titanium $X_n$, dimethylsilyl(tetramethylcyclopentadienyl)(cyclononylamido)titanium $X_n$, dimethylsilyl(tetramethylcyclopentadienyl)(cyclodecylamido)titanium $X_n$, dimethylsilyl(tetramethylcyclopentadienyl)(cycloundecylamido)titanium $X_n$, dimethylsilyl(tetramethylcyclopentadienyl)(cyclododecylamido)titanium $X_n$, dimethylsilyl(tetramethylcyclopentadienyl)(sec-butylamido)titanium $X_n$, dimethylsilyl(tetramethylcyclopentadienyl)(n-octylamido)titanium $X_n$, dimethylsilyl(tetramethylcyclopentadienyl)(n-decylamido)titanium $X_n$, dimethylsilyl(tetramethylcyclopentadienyl)(n-octadecylamido)titanium $X_n$, methylphenylsilyl(tetramethylcyclopentadienyl)(cyclopropylamido)titanium $X_n$, methylphenylsilyl(tetramethylcyclopentadienyl)(cyclobutylamido)titanium $X_n$, methylphenylsilyl(tetramethylcyclopentadienyl)(cyclopentylamido)titanium $X_n$, methylphenylsilyl(tetramethylcyclopentadienyl)(cyclohexylamido)titanium $X_n$, methylphenylsilyl(tetramethylcyclopentadienyl)(cycloheptylamido)titanium $X_n$, methylphenylsilyl(tetramethylcyclopentadienyl)(cyclooctylamido)titanium $X_n$, methylphenylsilyl(tetramethylcyclopentadienyl)(cyclononylamido) titanium $X_n$, methylphenylsilyl(tetramethylcyclopentadienyl)(cyclodecylamido)titanium, $X_n$, methylphenylsilyl(tetramethylcyclopentadienyl)(cycloundecylamido)titanium $X_n$, methylphenylsilyl(tetramethylcyclopentadienyl)(cyclododecylamido)titanium $X_n$, methylphenylsilyl(tetramethylcyclopentadienyl)(sec-butylamido)titanium $X_n$, methylphenylsilyl(tetramethylcyclopentadienyl)(n-octylamido)titanium $X_n$, methylphenylsilyl(tetramethylcyclopentadienyl)(n-decylamido)titanium $X_n$, methylphenylsilyl(tetramethylcyclopentadienyl)(n-octadecylamido)titanium $X_n$, diphenylsilyl(tetramethylcyclopentadienyl)(cyclopropylamido)titanium $X_n$, diphenylsilyl(tetramethylcyclopentadienyl)(cyclobutylamido)titanium $X_n$, diphenylsilyl(tetramethylcyclopentadienyl)(cyclopentylamido)titanium $X_n$, diphenylsilyl(tetramethylcyclopentadienyl)(cyclohexylamido)titanium $X_n$, diphenylsilyl(tetramethylcyclopentadienyl)(cycloheptylamido)titanium $X_n$, diphenylsilyl(tetramethylcyclopentadienyl)(cyclooctylamido)titanium $X_n$, diphenylsilyl(tetramethylcyclopentadienyl)(cyclononylamido)titanium $X_n$, diphenylsilyl(tetramethylcyclopentadienyl)(cyclodecylamido)titanium $X_n$, diphenylsilyl(tetramethylcyclopentadienyl)(cycloundecylamido)titanium $X_n$, diphenylsilyl(tetramethylcyclopentadienyl)(cyclododecylamido)titanium $X_n$, diphenylsilyl(tetramethylcyclopentadienyl)(sec-butylamido)titanium $X_n$, diphenylsilyl(tetramethyleyclopentadienyl)(n-octylamido)titanium $X_n$, diphenylsilyl(tetramethyleyclopentadienyl)(n-decylamido)titanium $X_n$, diphenylsilyl (tetramethylcyclopentadienyl)(n-octadecylamido)titanium $X_n$, and derivatives thereof, wherein the value of n is 1, 2, or 3. The phrase "derivatives thereof" will be understood to mean any substitution or ring formation as described above for structures (Va-d) in one exemplary embodiment; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine, chlorine, or bromine.

The metallocene catalyst may be selected from bis(n-propylcyclopentadienyl)hafnium $X_n$, bis(n-butylcyclopentadienyl)hafnium $X_n$, bis(n-pentylcyclopentadienyl)hafnium $X_n$, (n-propyl cyclopentadienyl)(n-butylcyclopentadienyl) hafnium $X_n$, bis[(2-trimethylsilylethyl)cyclopentadienyl] hafnium $X_n$, bis(trimethylsilyl cyclopentadienyl)hafnium $X_n$, dimethylsilylbis(n-propylcyclopentadienyl)hafnium $X_n$, dimethylsilylbis(n-butylcyclopentadienyl)hafnium $X_n$, bis (1-n-propyl-2-methylcyclopentadienyl)hafnium $X_n$, (n-propylcyclopentadienyl)(1-n-propyl-3-n-butylcyclopentadienyl)hafnium $X_n$, or combinations thereof, where $X_n$ is as described above.

In other embodiments, the metallocene catalyst may be a bis(n-propylcyclopentadienyl)hafnium dichloride, a bis(n-propylcyclopentadienyl)hafnium difluoride, or a dimethyl bis(n-propylcyclopentadienyl)hafnium.

It is contemplated that the metallocene catalysts components described above include their structural or optical or enantiomeric isomers (racemic mixture), and, in some embodiments, may be a pure enantiomer.

As used herein, a single, bridged, asymmetrically substituted metallocene catalyst component having a racemic and/or meso isomer does not, itself, constitute at least two different bridged, metallocene catalyst components.

Activator and Activation Methods for the Metallocene Catalyst Compounds

Catalyst systems herein may include an activator. The term "activator" is defined to be any compound or component which can activate a bulky ligand transition metal metallocene-type catalyst compound as described above. For example, a Lewis acid or a non-coordinating ionic activator or ionizing activator or any other compound that can convert a neutral metallocene catalyst component to a metallocene cation. Useful activators may include alumoxane or modified alumoxane, or ionizing activators, neutral or ionic, such as tri (n-butyl) ammonium tetrakis(pentafluorophenyl) boron or a trisperfluorophenyl boron metalloid precursor which ionize the neutral metallocene compound may also be used. A preferred activator used with the catalyst compositions described herein is methylaluminoxane ("MAO"). The MAO activator may be associated with or bound to a support, either in association with the catalyst component (e.g., metallocene) or separate from the catalyst component, such as described by Gregory G. Hlatky, *Heterogeneous Single-Site Catalysts for Olefin Polymerization*, 100(4) CHEMICAL REVIEWS 1347-1374 (2000).

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838 and European publications EP-A-0 561 476, EP-B1-0 279 586 and EP-A-0 594-218, and PCT publication WO 94/10180.

Ionizing compounds may contain an active proton, or some other cation associated with but not coordinated or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299, and 5,502,124.

Combinations of activators are also contemplated, for example, alumoxanes and ionizing activators in combination, see for example, PCT publications WO 9407928 and WO 95/14044 and U.S. Pat. Nos. 5,153,157 and 5,453,410.

Method for Supporting

As noted above, supports may be present as part of the catalyst system. Supports, methods of supporting, modifying, and activating supports for single-site catalyst such as metallocenes are discussed in, for example, 1 METALLOCENE-BASED POLYOLEFINS 173-218 (J. Scheirs & W. Kaminsky eds., John Wiley & Sons, Ltd. 2000). The terms "support" or "carrier," as used herein, are used interchangeably and refer to any support material, including inorganic or organic support materials. In some embodiments, the support material may be a porous support material. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

Desirable supports are inorganic oxides that include Group 2, 3, 4, 5, 13, and 14 oxides and chlorides. Support materials may include silica, alumina, silica-alumina, magnesium chloride, graphite, and mixtures thereof. Other useful supports include magnesia, titania, zirconia, montmorillonite (as described in EP0511665B1), phyllosilicate, and the like. In some embodiments, combinations of the support materials may be used, including, but not limited to, combinations such as silica-chromium, silica-alumina, silica-titania, and the like. Additional support materials may include those porous acrylic polymers described in EP0767184B1.

Examples of supporting a catalyst system are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847 and 5,665,665, 5,468,702, and 6,090,740 and PCT publications WO 95/32995, WO 95/14044, WO 96/06187, and WO 97/02297.

In some embodiments, the catalyst system contains a polymer bound ligand as described in U.S. Pat. No. 5,473,202. In some embodiments, the support may be functionalized as described in European publication EP-A-0802203 or at least one substituent or leaving group is selected as described in U.S. Pat. No. 5,688,880.

The catalyst system may be spray dried as described in U.S. Pat. No. 5,648,310 after which the dried catalyst system is contacted with the selected liquid agent to saturate the pores of the catalyst.

In some embodiments, the supported catalyst may be produced by a method wherein the selected liquid agent is used as a solvent during manufacture of the catalyst or the solvent used during manufacture of the catalyst is displaced with the selected liquid agent.

In other embodiments, the supported catalyst systems may include an antistatic agent or surface modifier, for example, those described in U.S. Pat. No. 5,283,278 and PCT publication WO 96/11960.

Polymerization Process

Polymerization processes for embodiments herein may be carried out using any suitable gas-phase process. A particularly desirable method for producing polyolefin polymers is a gas phase polymerization process preferably utilizing a fluidized bed reactor. This type of reactor, and means for operating the reactor, are well known and completely described in, for example, U.S. Pat. Nos. 3,709,853; 4,003,712; 4,011,382; 4,302,566; 4,543,399; 4,882,400; 5,352,749; 5,541,270; and EP-A-0 802 202. These patents describe gas phase polymerization processes wherein the polymerization medium is either mechanically agitated or fluidized by the continuous flow of the gaseous monomer and diluent.

Other gas phase processes contemplated include series or multistage polymerization processes. Other gas phase processes contemplated include those described in U.S. Pat. Nos. 5,627,242, 5,665,818 and 5,677,375, and European publications EP-A-0 794 200 EP-B1-0 649 992, EP-A-0 802 202 and EP-B-634 421.

In general, the polymerization process may be a continuous gas phase process, such as a fluid bed process. A fluid bed reactor for use in the process typically has a reaction zone and a so-called velocity reduction zone. The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. The gas is passed through a heat exchanger wherein the heat of polymerization is removed, compressed in a compressor and then returned to the reaction zone.

The gas phase processes are suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms; ethylene and a comonomer comprising from 3 to 12 carbon atoms; ethylene and a comonomer comprising from 4 to 10 carbon atoms; or ethylene and a comonomer comprising from 4 to 8 carbon atoms. Olefins that may be used herein include ethylene, propylene, 1-butene, 1-pentene, 1-hexene, 1-heptene, 1-octene, 4-methylpent-1-ene, 1-decene, 1-dodecene, 1-hexadecene, and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. In some embodiments of the process described herein, ethylene may be polymerized with at least two different comonomers, optionally one of which may be a diene, to form a terpolymer.

Other monomers useful in the processes described herein include ethylenically unsaturated monomers, diolefins having 4 to 18 carbon atoms, conjugated or non-conjugated dienes, polyenes, vinyl monomers, and cyclic olefins. Non-limiting monomers useful in embodiments herein may include norbornene, norbornadiene, isobutylene, isoprene, vinylbenzocyclobutane, styrenes, alkyl substituted styrene, ethylidene norbornene, dicyclopentadiene and cyclopentene.

Further, it is common to use a staged reactor employing two or more reactors in series, wherein one reactor may produce, for example, a high molecular weight component and another reactor may produce a low molecular weight component. In embodiments, the polyolefin is produced using a staged gas phase reactor. Such commercial polymerization systems are described in, for example, 2 METALLOCENE-BASED POLYOLEFINS 366-378 (John Scheirs & W. Kaminsky, eds. John Wiley & Sons, Ltd. 2000); U.S. Pat. Nos. 5,665,818, 5,677,375, and EP-A-0 794 200.

The one or more reactors in a gas phase or fluidized bed polymerization process may have a pressure ranging from about 0.7 to about 70 bar (about 10 to 1000 psia); or a pressure ranging from about 14 to about 42 bar (about 200 to about 600 psia). The one or more reactors may have a temperature ranging from about 10° C. to about 150° C.; or from about 40° C. to about 125° C. The reactor temperature may be operated at the highest feasible temperature taking into account the sintering temperature of the polymer within the reactor, and the selected temperature target may depend upon the type of liquid agent used and the resulting impact on the polymer melt flow ratio, as discussed above. For example, for the production of a typical bulky ligand metallocene-catalyzed resin in a fluidized bed gas-phase reactor, the reactor bed temperature is normally operated considerably below the melting temperature (e.g., DSC, $2^{nd}$ melt) of the produced polymer. For a typical bulky ligand metallocene LLDPE film resin of 0.912 g/cc density and a melt index of 1 dg/min, the melting temperature of the polymer is in the range of 116° C. to 117° C. (as measured by DSC $2^{nd}$ melt). For these grades the bed temperature would normally be set at or around 80° C. Stickiness in the polymer would be induced if the reactor bed temperature were increased significantly. The superficial gas velocity in the one or more reactors may range from about 0.2 to 1.1 meters/second (0.7 to 3.5 feet/second); or from about 0.3 to 0.8 meters/second (1.0 to 2.7 feet/second).

The polymerization process may be a continuous gas phase process that includes the steps of: (a) introducing a recycle stream (including ethylene and alpha olefin monomers) into the reactor; (b) introducing the supported catalyst system saturated with a selected liquid agent; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

Embodiments may employ a condensing mode polymerization, such as those disclosed in U.S. Pat. Nos. 4,543,399; 4,588,790; 4,994,534; 5,352,749; 5,462,999; and 6,489,408. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304.

EXAMPLES

The polymerization reactions described in the following examples were conducted in a continuous pilot-scale gas phase fluidized bed reactor of 0.35 meters internal diameter and 2.3 meters in bed height. The fluidized bed was made up of polymer granules. The gaseous feed streams of ethylene and hydrogen together with liquid comonomer were introduced below the reactor bed into the recycle gas line. Hexene was used as comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

In comparative examples, the supported catalyst was injected directly into the fluidized bed as a dry catalyst system using purified nitrogen as a carrier. The feed rate of the catalyst was adjusted to maintain a constant production rate.

In the inventive examples, the supported catalyst system was over-saturated with a selected liquid agent, namely a purified mineral oil (HYDROBRITE 380), and injected directly into the reactor. The rate of the catalyst feed was adjusted to maintain a constant production rate of polymer.

The reacting bed of growing polymer particles was maintained in a fluidized state by the continuous flow of the make-up feed and recycle gas through the reaction zone. A superficial gas velocity of 0.6-0.9 meters/sec was used. The reactor was operated at a total pressure of 2240 kPa. The reactor was operated at a constant reaction temperature of 74° C. to 78° C. depending on the desired product.

The fluidized bed was maintained at a constant height by withdrawing a portion of the bed at a rate equal to the rate of formation of particulate product. The rate of product formation (the polymer production rate) was in the range of 15-25 kg/hour. The product was removed semi-continuously via a series of valves into a fixed volume chamber. This product was purged to remove entrained hydrocarbons and treated with a small steam of humidified nitrogen to deactivate any trace quantities of residual catalyst.

The catalyst system used in the examples was Catalyst 1, which is a silica supported bis(n-propyl-cyclopentadiene) hafniumdimethyl that had been activated with methylalumoxane. To prepare Catalyst 1 the following method may be used. A 10 wt % to 30 wt % solution of MAO in toluene and additional toluene (dried and degassed) was introduced to a mixer at room temperature and slowly stirred. The bis(n-propylcyclopentadiene)hafniumdimethyl metallocene catalyst compound was dissolved in 100 g of toluene and introduced to the mixer containing the MAO and toluene mixture. The stirring speed was increased to 130 rpm and continued for 1 hour at room temperature. The silica support was then introduced to the mixer and stirred 1 hour at room temperature. A vacuum was then applied to remove the free liquid. Once the material was through the "mud stage," i.e., no free liquid was visible, a nitrogen gas purge was introduced to the mixer. During the mixing of the support, metallocene, and MAO, the temperature of the mixture was increased to a final temperature of about 78° C. to 80° C. and mixed for about 2 hours. The mixture was then cooled down to room temperature and stored in an oven-dried container under a nitrogen atmosphere. The silica support used had a surface area of about 300 m$^2$/g, a pore volume of about 1.5 cm$^3$/g, and a particle size of about 25 um, and had been dehydrated at 875° C.

Comparative Example 1

Tests were carried out in the above-mentioned polymerization reactor to evaluate the effect of catalyst delivery method on product properties and specifically Melt Flow Ratio (MFR). Catalyst 1 was used in Example 1. In this example, the solid Catalyst 1 was injected directly into the fluidized bed using purified nitrogen as a carrier. The injection rate was adjusted to maintain a constant production rate. The reactor was operated to produce a LLDPE-type product for film application with 0.8 to 1.2 dg/min melt index and 0.917 to 0.919 gm/cc density at the following reaction conditions: reaction temperature of 78° C., ethylene partial pressure of 220 psia, hexene-to-ethylene molar ratio of 0.0152 and hydrogen-to-ethylene concentration of 6.9 ppm/mole % at a residence time of 2.66 hours. The reactor operated smoothly at these conditions. The product melt flow ratio at lined out conditions was 29.5. The catalyst productivity as measured using Hf XRF was 9849 gm/gm normalized for 2.5 hour residence time.

Example 2

In Example 2, the dry Catalyst 1 was over-saturated with a purified mineral oil (HYDROBRITE 380) to have solids concentration of about 18 weight percent. The over-saturated catalyst was injected directly into the reactor and the rate of the catalyst feed was adjusted to maintain a constant production rate of polymer. The reactor was operated at comparable conditions as those used in Comparative Example 1 to produce a LLDPE type product for film application with 0.8 to 1.2 dg/min melt index and 0.917 to 0.919 gm/cc density at the following reaction conditions: reaction temperature of 77° C., ethylene partial pressure of 220 psia, hexene-to-ethylene molar ratio of 0.0158 and hydrogen-to-ethylene concentration of 7.0 ppm/mole % at a residence time of 3.44 hours. The reactor operated smoothly at these conditions. The product melt flow ratio at lined out conditions was much higher than that measured in Comparative Example 1, 35.5, and the catalyst productivity as measured using Hf XRF was 11166 gm/gm (normalized for 2.5 hour residence time).

The results of Comparative Example 1 and Example 2 are shown in Table 1 below.

TABLE 1

|  | Catalyst Feed | Melt Index | Density | Melt Flow Ratio | Catalyst Productivity |
| --- | --- | --- | --- | --- | --- |
| Comparative Example 1 | Dry | 0.87 | 0.9182 | 29.5 | 9849 |
| Example 2 | Saturated | 0.95 | 0.9192 | 35.5 | 11166 |

Comparative Example 3

Another set of tests were carried out in the above-mentioned polymerization reactor to evaluate the effect of catalyst delivery method on product properties and specifically melt flow ratio (MFR) at different reaction conditions.

As in Comparative Example 1 and Example 2, Catalyst 1 was used. In Comparative Example 3, the solid Catalyst 1 was injected directly into the fluidized bed as a dry catalyst system using purified nitrogen as a carrier, and the catalyst feed rate was adjusted to maintain a constant production rate. The reactor was operated to produce an LLDPE type product for film applications with 0.8 to 1.2 dg/min melt index and 0.917 to 0.919 gm/cc density at the following reaction conditions: reaction temperature of 74.5° C., ethylene partial pressure of 200 psia, hexene-to-ethylene molar ratio of 0.0132 and hydrogen-to-ethylene concentration of 5.5 ppm/mole % at a residence time of 1.9 hours. The reactor operated smoothly at these conditions. The product melt flow ratio at lined out conditions was 28.9 and the catalyst productivity as measured using Hf XRF was 10158 gm/gm (normalized for 2.5 hour residence time).

Example 4

In Example 4, the same dry catalyst (Catalyst 1) mentioned above was over-saturated with purified mineral oil (HB-380) to have solid concentration of 18 weight percent. In this example, as mentioned above, the catalyst was injected directly into the reactor, and the rate of the catalyst feed was adjusted to maintain a constant production rate of polymer. The reactor was operated at comparable conditions as those used in example 3 to produce a LLDPE type product for film application with 0.8 to 1.2 dg/min melt index and 0.917 to 0.919 gm/cc density at the following reaction conditions: reaction temperature of 74.5° C., ethylene partial pressure of 200 psia, hexene-to-ethylene molar ratio of 0.014 and hydrogen-to-ethylene concentration of 7.5 ppm/mole % at a residence time of 1.9 hours. The reactor operated smoothly at these conditions. The product melt flow ratio at lined out conditions was much higher than that measured in Comparative Example 3, 32.5, and the catalyst productivity as measured using Hf XRF was 13326 gm/gm (normalized for 2.5 hour residence time).

The results of Comparative Example 3 are compared to those for Example 4 in Table 2 below.

TABLE 2

| | Catalyst Feed | Melt Index | Density | Melt Flow Ratio | Catalyst Productivity |
|---|---|---|---|---|---|
| Comparative Example 3 | Dry | 1.0 | 0.9185 | 28.9 | 10158 |
| Example 4 | Saturated | 0.84 | 0.9182 | 32.5 | 13326 |

As shown in Tables 1 and 2 above, delivering the Hf-based catalyst, saturated with a selected liquid agent to the gas phase polymerization reactor results in substantial improvement in product melt flow ratio over delivering the same catalyst in dry form (comparative examples).

As described above, embodiments herein are directed toward saturation of a catalyst system with a selected liquid agent and delivery of the saturated catalyst system to a gas phase polymerization reactor to advantageously impact catalyst properties and/or polymer product properties, such as melt flow ratio. Advantageously, use of a selected liquid agent may provide for one or more of increased catalyst productivity, increased reactor capacity, increased polymer melt flow ratio, improved polymer processability, and other various improvements noted above and/or recognizable to those of ordinary skill in the art.

While the invention has been described with respect to a number of embodiments, those skilled in the art, having benefit of this disclosure, will appreciate that other embodiments can be devised which do not depart from the scope of the invention as disclosed herein. Accordingly, the scope of the invention should be limited only by the attached claims.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The invention claimed is:

1. A process for the production of an ethylene alpha-olefin copolymer comprising:
   feeding a catalyst system comprising a silica supported bis(n-propyl-cyclopentadiene)hafniumdimethyl with methylalumoxane having pores saturated with a hydrocarbon having at least 12 carbon atoms to a gas phase polymerization reactor;
   contacting ethylene and an alpha-olefin with the silica supported bis(n-propyl-cyclopentadiene)hafniumdimethyl with methylalumoxane in the gas phase polymerization reactor to produce an ethylene alpha-olefin copolymer having:
   a density of less than 0.93 g/cm$^3$,
   a melt index ($I_2$) of less than 2 dg/min and;
   a melt flow ratio ($I_{21}/I_2$) of at least 28.

2. The process of claim 1, further comprising selecting the hydrocarbon to result in an ethylene alpha-olefin copolymer with an increased melt flow ratio versus an ethylene alpha-olefin copolymer produced with the same silica supported bis(n-propyl-cyclopentadiene)hafniumdimethyl with methylalumoxane fed to the reactor as a dry particle system under equivalent reaction conditions.

3. The process of claim 2, further comprising admixing the hydrocarbon with the silica supported bis(n-propyl-cyclopentadiene)hafniumdimethyl with methylalumoxane to saturate or over-saturate the pores.

4. The process of claim 1, wherein the ethylene alpha-olefin copolymer has a ratio of melt flow ratio to melt index of at least 33:1.

5. The process of claim 1, wherein the hydrocarbon is selected to decrease a rate of temperature increase of the silica supported bis(n-propyl-cyclopentadiene)hafniumdimethyl with methylalumoxane during an initial contact stage upon entry to the reactor as compared to the same silica supported bis(n-propyl-cyclopentadiene)hafniumdimethyl with methylalumoxane fed to the reactor as a dry particle system.

6. The process of claim 1, wherein the hydrocarbon is selected to alter a kinetic profile of catalytically active sites on the silica supported bis(n-propyl-cyclopentadiene)hafniumdimethyl with methylalumoxane during an initial contact stage upon entry to the reactor as compared to the same silica supported bis(n-propyl-cyclopentadiene)hafniumdimethyl with methylalumoxane fed to the reactor as a dry particle system.

7. The process of claim 1, wherein the hydrocarbon is selected to produce an ethylene alpha-olefin having a melt flow ratio substantially equal to that produced by the same silica supported bis(n-propyl-cyclopentadiene)hafniumdimethyl with methylalumoxane fed to the reactor as a dry particle system when produced at a temperature at least 2° C. greater than for the dry particle system under otherwise equivalent reaction conditions.

8. The process of claim 1, wherein the ethylene alpha-olefin copolymer has a melt flow ratio at least 10% greater than an ethylene alpha-olefin copolymer produced with the same silica supported bis(n-propyl-cyclopentadiene)hafniumdimethyl with methylalumoxane fed to the reactor as a dry particle system under equivalent reaction conditions.

9. The process of claim 1, wherein the silica supported bis(n-propyl-cyclopentadiene)hafniumdimethyl with methylalumoxane has a catalyst productivity at least 10% greater than the same silica supported bis(n-propyl-cyclopentadiene)hafniumdimethyl with methylalumoxane fed to the reactor as a dry particle system under equivalent reaction conditions.

10. The process of claim 1, wherein the ethylene alpha-olefin copolymer has a melt flow ratio at least 2 units greater than an ethylene alpha-olefin copolymer produced with the same silica supported bis(n-propyl-cyclopentadiene)hafniumdimethyl with methylalumoxane fed to the reactor as a dry particle system under equivalent reaction conditions.

11. The process of claim 1, wherein the ethylene alpha-olefin copolymer has a melt index in the range from about 0.5 dg/min to about 1.5 dg/min.

12. The process of claim 1, wherein the ethylene alpha-olefin copolymer has a melt flow ratio of at least 32.

13. The process of claim 1, wherein the ethylene alpha-olefin copolymer has a melt flow ratio of at least 35.

14. The process of claim 1, wherein the ethylene alpha-olefin copolymer has a density in the range from about 0.900 g/cm$^3$ to about 0.93 g/cm$^3$.

15. The process of claim 1, wherein the hydrocarbon comprises a mineral oil.

16. The process of claim 1, wherein the catalyst system further comprises at least one of an activating agent and a co-catalyst.

* * * * *